W. P. DWYER.
SAFETY DEVICE FOR AUTOMOBILES.
APPLICATION FILED JUNE 24, 1921.
1,397,043.
Patented Nov. 15, 1921.
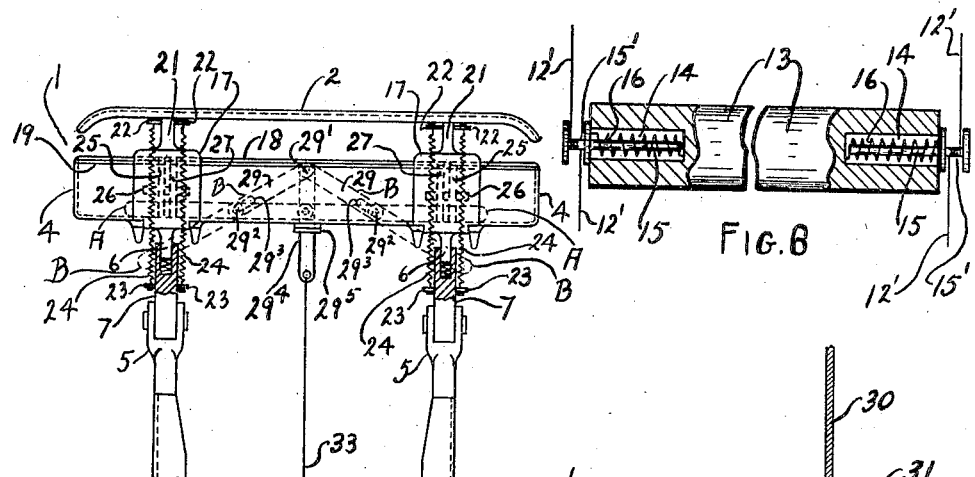
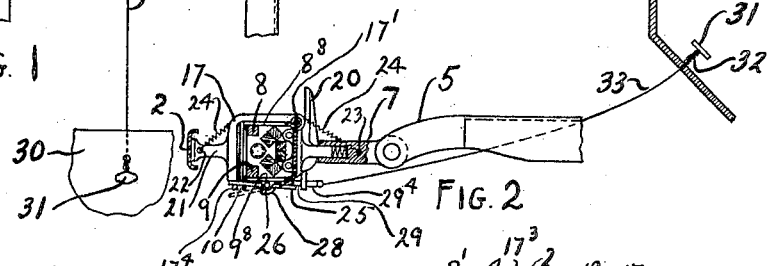
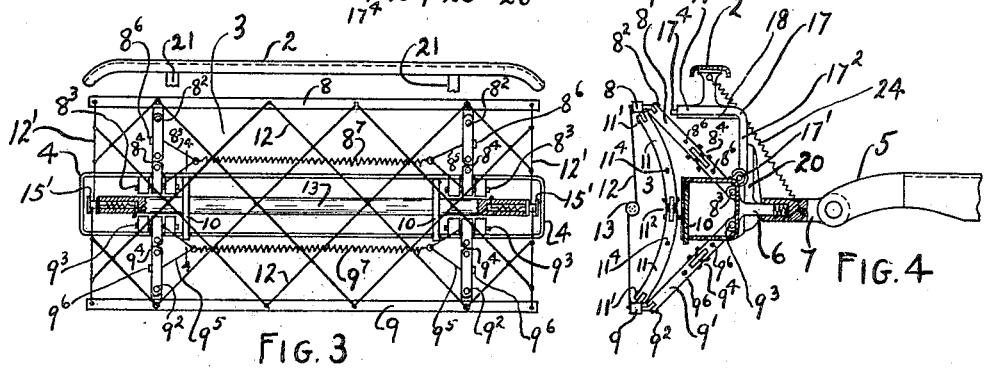
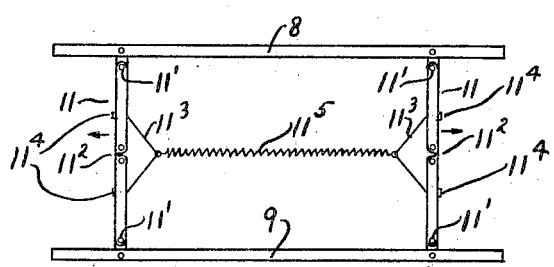
INVENTOR
William P. Dwyer

UNITED STATES PATENT OFFICE.

WILLIAM PATRICK DWYER, OF WEST FLAMBORO, ONTARIO, CANADA.

SAFETY DEVICE FOR AUTOMOBILES.

1,397,043.   Specification of Letters Patent.   Patented Nov. 15, 1921.

Application filed June 24, 1921. Serial No. 480,069.

*To all whom it may concern:*

Be it known that I, WILLIAM PATRICK DWYER, a subject of the King of Great Britain, and a resident of the village of West Flamboro, in the county of Wentworth, in the Province of Ontario, Dominion of Canada, have invented certain new and useful Improvements in Safety Devices for Automobiles, of which the following is a specification.

My invention relates to safety devices for automobiles and the object of the invention is broadly to provide a resilient safety device in front of the automobile; a further object is to provide such a device which will normally be inoperative but which may be quickly and conveniently brought into operation by the driver.

My invention consists essentially of a combined bumper and fender comprising a collapsible, spring actuated, resilient fender, which is normally held in a collapsed position in a suitable casing behind the ordinary bumper, means controlled by the driver of the automobile for raising the bumper and simultaneously projecting the fender forwardly into an open or extended position in front of the automobile, the combined bumper and fender replacing the ordinary bumper now commonly used on automobiles, all as hereinafter more particularly described and illustrated in the accompanying drawings in which;

Figure 1 is a diagrammatic plan view showing a portion of the front ends of the dumb irons of an automobile frame with my invention mounted thereon, the bumper being in its normal position in front of the car and the emergency fender being collapsed and located within its inclosing casing.

Fig. 2 is a side elevation of Fig. 1, the casing and emergency fender collapsed therein, being shown in section.

Fig. 3 is a diagrammatic front elevation showing the emergency fender in the open extended position, certain members being omitted for clearness and the bumper which is in its raised inoperative position, being merely indicated.

Fig. 4 is a side elevation showing the emergency fender in its open position in front of the automobile, the casing being in section about the line 4, 4 of Fig. 3.

Fig. 5 is a diagrammatic front view showing the top and bottom horizontal members of the fender frame, with the forward articulated brackets therefore and the operating spring connecting said brackets.

Fig. 6 is an enlarged detail view of the center roller of the fender showing the end construction thereof, the roller broken away intermediately of its length.

Like characters of reference indicate corresponding parts in the different views.

1 indicates collectively my combined bumper and fender which comprises the bumper 2 and the collapsible fender 3.

The assembly 1 is carried by a casing 4 which casing is supported from the front ends of the dumb irons 5 of the automobile frame in the same manner and in the same position as the standard form of bumper is ordinarily mounted, as for instance by the rearwardly extending arms 6 carried by the casing 4 engaging orifices in the brackets 7 which brackets are secured to the dumb irons 5.

The casing 4 has an open front face to permit passage of the fender 3.

8 and 9 are top and bottom horizontal frame members of the fender 3.

$8^1$ and $9^1$ are upper and lower inclined rear articulated supports for the fender 3 and each has one end pivotally connected at $8^2$ and $9^2$ respectively to the members 8 and 9 near each end thereof, and the other end pivotally connected at $8^3$ and $9^3$ to the rear inner face of the casing 4.

The supports $8^1$ and $9^1$ are hinged intermediately of their length at $8^4$ and $9^4$ respectively, said hinges being so constructed that the hinge points cannot move inwardly toward each other beyond the straight line joining the ends of the support.

The upper supports $8^1$ each carry loops $8^5$ which are connected to the supports at opposite sides of the hinge points $8^4$ at $8^6$, and $8^7$ is a coil spring having its ends connected to the loops $8^5$.

The lower supports $9^1$ each carry similar loops $9^5$ which are similarly connected to the supports at opposite sides of the hinge points $9^4$ at $9^6$, and $9^7$ is a coil spring having its ends connected to the loops $9^5$.

The casing 3 is provided with rearwardly extending slots $8^8$ and $9^8$ in its top and bottom faces to permit the supports $8^1$ and $9^1$ to move from their collapsed to their extended positions as will hereinafter appear.

10 are two depending fingers having their top ends hingedly connected to the top front edge of the casing 4, said fingers engaging notches in the lower front edge of the casing 4 and projecting beyond the bottom of the casing for a purpose as will hereinafter appear.

11 are front articulated braces of the fender 3 and are pivotally connected at each end at $11^1$ to the upper and lower members 8 and 9.

The braces 11 are hinged centrally of their length at $11^2$ and the hinges are so constructed that the hinge points cannot move inwardly toward each other beyond the straight line joining the ends of the support.

The braces 11 each carry loops $11^3$ which are connected to the braces at opposite sides of the hinge points $11^2$ at $11^4$, and $11^5$ is a coil spring having its ends connected to the loops $11^3$.

Each pair of upper and lower rear supports $8^1$ and $9^1$, with the adjacent front brace 11 lie in the same vertical plane when the fender is in the extended or open position.

12 is a rope or similar mesh net which is secured to the members 8 and 9 of the fender frame.

13 is a roller to which the net 12 is secured. This roller is provided with recesses 14 at each end thereof and 15 are spindles freely engaging said recesses. $15^1$ are flanged spool like portions formed at the outer ends of these spindles.

16 are two coil springs each mounted upon one of the spindles 15 within the recesses 14 and each has its inner end secured to the roller 13 and its outer end to one of the spindles 15.

The coil springs 16 are arranged in opposed disposition for a purpose as will presently appear.

The side members $12^1$ of the net 12 are secured to the spools $15^1$ (see Figs. 4 and 6).

17 are two right angular brackets which are hingedly carried by the rear top edge of the casing 4 at $17^1$ and each comprises the upper portion $17^2$ and the front portion $17^3$ (see Fig. 4). One of these brackets is located adjacent to each end of the casing 4.

$17^4$ is a depending stud carried by the lower end of the portion $17^3$ of each bracket 17 and is adapted to extend below the bottom of the casing 4 for a purpose as will presently appear.

18 is a cover strip carried by the brackets 17 and is adapted to close the front open face of the casing when the brackets 17 are in the lowered position.

19 is a felt filler strip covering the front edges of the casing 4.

20 are rigid stops carried by the casing 4 extending upwardly therefrom and constitute stops limiting the backward movement of the brackets 17 (see Fig. 4).

21 are two forwardly extending arms each rigidly carried by one of the brackets 17 and to the front ends of these arms is secured the ordinary bumper 2.

22 are laterally extending pins carried by the forward ends of the arms 21 and 23 are similarly disposed pins carried by the brackets 7.

24 are coil springs each secured at one end to one of the pins 22 and at the other end to one of the pins 23, there being four such springs arranged in two pairs, the springs of each pair lying at either side of the adjacent arm 21.

25 are two rocker arms pivotally mounted intermediately of their length in brackets 26 on the under side of the casing 4 and are each provided with an orifice adjacent to its forward end which orifice is adapted to engage the depending studs $17^4$ for retaining the brackets 17 in the lowered position.

27 are two similar rocker arms also mounted in the brackets 26 and each provided with an orifice near its forward end adapted to engage the depending fingers 10 for retaining them in position across the front of the casing 4.

28 are springs normally tending to force the rear ends of the rocker arms 25 and 27 upwardly and the front ends downwardly, i. e. they tend to break the engagement between the rocker arms and the studs $17^4$ and fingers 10.

29 are two levers pivotally connected at their inner ends at $29^1$ and each is pivotally connected intermediately of its length to the casing 4 by a pin $29^2$ which engages a slot $29^3$ in the lever.

$29^4$ is a link slidably mounted in a guide $29^5$ carried by the casing 4 and having one end connected to the pivot pin $29^1$. The outer free ends of the levers 29 constitute wedges adapted to engage between the bottom of the casing 4 and the rear ends of each pair of rocker arms 25 and 27 for holding said rear ends depressed against the pressure of the springs 28.

30 indicates a portion of the car body and 31 is an operating handle mounted thereon and located adjacent to the driver. 32 is a coil spring normally maintaining said operating lever raised.

33 is a rigid connecting rod having one end connected to the operating handle 31 and the other end connected to the free end of the link $29^4$.

The construction and operation of my invention is as follows:

Considering the parts to be in the normal collapsed position as shown in Figs. 1 and 2:

It will be noted that the device, consisting of the assembly of the casing 4, carrying the bumper 2 and the collapsed fender 3 is mounted upon the automobile in the same manner as the ordinary bumper and in fact that the device replaces the usual bumper.

In the ordinary course of driving the fender 3 is contained in the collapsed form within the casing 4 (see Fig. 2) and the bumper 2 extends transversely in front of the car in the ordinary manner.

The parts are retained in this position by means of the engagement of the depending studs 17⁴ of the brackets 17 with the orifices in the front ends of the rocker arms 25, which holds the brackets 17 in the lowered position, and further by means of the engagement of the lower ends of the fingers 10 with the orifices in the front ends of the rocker arms 27, which holds these fingers 10 in the position extending across the front of the casing 4 and thus retaining the fender 3 collapsed therein.

Further in this position the levers 29 are situated as shown at "A" in Fig. 1 in which position their free ends are wedged between the casing 4 and the rear ends of the rocker arms 25 and 27 thus depressing these rear ends against the pressure of the springs 28 and raising the forward ends to maintain the engagement of the orifices therein with the studs 17⁴ and fingers 10. The spring 32 tends to force the operating handle 31 outwardly and thus to draw the link 29⁴ rearwardly and maintain the links 29 in the position "A."

In this position it will be noted that the bumper 2 is in its normal position and that the emergency fender 3 is collapsed out of sight and is entirely inoperative.

When the fender 3 is thus collapsed within the casing 4 the articulated rear supports 8¹ and 9¹ and the front braces 11 fold outwardly in the direction of the arrows in Fig. 5 and therefore as the fender is collapsed the springs 8⁷ and 9⁷ and 11⁵ are further stretched, thus increasing the pull exerted by these springs upon the parts connected thereby and increasing the tendency of said springs to open the fender upon the release of the locking mechanism.

Considering now the operation of the emergency fender 3:

The emergency fender 3 may be instantly brought into the extended or operative position by simply depressing the handle 31, the operation being as follows:—

Upon the depression of the handle 31 the link 29⁴ is pushed forwardly thus moving the pivot pin 29¹ forwardly and oscillating the links 29 about their pivot points 29² and bringing these links 29 from the position at "A" in Fig. 1 to the position at "B." The slots 29³ in the links are necessary to permit this operation to be accomplished.

This oscillation of the links 29 from the position "A" to "B" withdraws the wedged free ends from engagement with the rear ends of the rocker arms 25 and 27 so that under the action of the springs 28 these rocker arms are oscillated so that their front orificed ends are depressed and the engagement is broken between the depending studs 17⁴ and fingers 10 and the orifices in the rocker arms.

The disengagement of the studs 17⁴ from the orifices in the rocker arms 25 immediately releases the bumper 2 so that it is swung instantly upward into the inoperative position under the action of the springs 24, the stops 20 limiting the backward movement of the bumper. This position is shown in Fig. 4.

The disengagement of the fingers 10 from the orifices in the rocker arms 27 immediately releases these fingers so that they are no longer held in the position extending across the front of the casing 4 and therefore the fender 3 which has been held collapsed within the casing instantly flies outwardly from the casing into the extended position. This position is also shown in Fig. 4.

The operation of the fender 3 in moving from the collapsed position within the casing 4 to the extended position will now be described.

As has already been stated when the fender is collapsed the springs 8⁷, 9⁷ and 11⁵ are under very considerable tension so that immediately the fingers 10 are released from the rocker arms 27 and the fender is free to move outwardly from the casing 4, these springs instantly pull the hinge points 8⁴, 9⁴ and 11² inwardly toward each other, thus opening the fender frame and supporting it in the extended position shown in Figs. 3 and 4.

Owing to the peculiar construction of the hinges 8⁴, 9⁴ and 11² already referred to, whereby they cannot move toward each other beyond the straight line joining the ends of the corresponding support, the top and bottom horizontal members 8 and 9 of the fender are firmly and rigidly supported in the extended position.

In order to permit the free opening of the fender, the rearwardly extending slots 8⁸ and 9⁸ are provided in the top and bottom of the casing and, in the extended position the rear supports 8¹ and 9¹ extend through these slots.

Owing to the considerable tension in the springs 8⁷, 9⁷ and 11⁵, the fender is firmly held in the open position.

In order to insure that the net 12 will at all times be held tight and also to take care of the slack in the net when the fender is being collapsed I provide the novel method of mounting the net as has been already described and the operation of which is as follows:

From an examination of Fig. 3 it will be evident that as the fender is forced open and the members 8 and 9 move away from each other the spindles 15 carried by the ends of the roller 13 will be rotated by the end portions 12¹ of the net and thus the coil springs 16 will be tightened.

In this way the springs 16 will tend to rotate the roller 13 in the opposite direction to roll up the net thereon. This tendency to roll up the net will maintain the net tightly stretched in the open position of the fender but, of course, since the springs 16 are comparatively weak as compared to the springs 8⁷, 9⁷ and 11⁵ there will be no actual effect in collapsing the fender.

Further, as soon as the fender is collapsed and the members 8 and 9 move toward each other, the slack produced in the net is immediately taken up by the roller 13 which immediately rotates and winds all slack in the net upon itself as soon as such slack is produced and this facilitates the collapsing of the fender within the casing 4, since there will be no loose net but it will all be wound upon the roller 13.

The operation of collapsing the fender 3 after it has served its emergency purpose is as follows:

The top and bottom horizontal members 8 and 9 are pressed inwardly toward each other, and the braces 11 are collapsed about their hinge points 11² so that these hinge points are forced outwardly away from each other.

When the members 8 and 9 have moved sufficiently toward each other to have brought the rear braces 8¹ and 9¹ out of the slots 8⁸ and 9⁸ in the casing, these braces 8¹ and 9¹ are collapsed about their hinge points 8⁴ and 9⁴ so that these hinge points are forced outwardly away from each other.

The collapsing of the fender is then completed by continuing to press the members 8 and 9 together and then forcing the whole collapsed fender backwardly into the casing 4.

When the fender is in the completely collapsed position within the casing it is retained therein by engagement between the fingers 10 and rocking levers 27 as has been already described.

It will be noted that in the operation of collapsing the fender the tension in the springs 8⁷, 9⁷ and 11⁵ is increased due to the outward movement of the hinge points 8⁴, 9⁴ and 11² so that the spring tension tending to force the fender outwardly into the extended position is increased.

After the collapsing of the fender the bumper 2 is drawn downwardly into the normal position shown in Fig. 2, against the tension of the springs 24 and is retained in this lowered position by engagement between the studs 17⁴ and rocking arms 25.

The levers 29 as has been already explained are normally held in the position at "A" (see Fig. 1) by means of the spring 32 acting on the operating handle 31.

When in the extended position it will be seen that the fender 3 constitutes a resilient fender in front of the automobile.

From the foregoing it will be evident that I have devised an improved safety device for automobiles which while being normally out of sight may be instantly thrown into the operative position in which it will provide a valuable means of preventing accidents and serious damage.

Many modifications may be made in my invention without departing from the spirit of the same or the scope of the claims and therefore the forms shown are to be taken as illustrative only and not in a limiting sense.

For instance many ways of mounting the device on the automobile could be used and also it would be possible to use the collapsible fender 3 and casing 4 with the ordinary type of bumper in which case the casing would be mounted to the rear and below the ordinary bumper.

What I claim as my invention is:

1. In a safety device for automobiles, the combination with the bumper of the automobile normally disposed transversely of and in front of the automobile, of an independent collapsible fender adapted to be held in an inoperative position behind the bumper, means for swinging the bumper backwardly into an inoperative position and independent means for projecting the fender forwardly into an extended position in front of the automobile simultaneously with the backward movement of the bumper.

2. In a safety device for automobiles, the combination with the automobile frame, of a horizontally disposed transverse casing carried by the front end of the frame and having its front face open, a collapsible fender adapted to be carried in a collapsed, inoperative position within said casing and means for projecting said fender forwardly through the open front face of the casing to occupy an extended operative position in front of the automobile.

3. In a safety device for automobiles, the combination with the automobile frame, of a horizontally disposed transverse casing carried by the front end of the frame and having its front face open, a collapsible fender, means for retaining said fender in a collapsed form within the casing, spring means for projecting said fender forwardly through the open front face of the casing to occupy an extended operative position in front of the automobile upon the release of said retaining means and hinged articulated supporting members connecting the fender to the interior of the casing.

4. In a safety device for automobiles, the combination with the automobile frame, of a horizontally disposed transverse casing carried by the front end of the frame, a bumper hingedly carried by the frame, means for normally retaining the bumper in a transverse position in front of the casing, a collapsible fender, means for retaining said fender in a collapsed form within the casing, spring means for swinging the bumper upwardly and backwardly into an inoperative position upon the release of the aforesaid retaining means therefor, independent spring means for projecting the fender forwardly from the casing into an extended operative position in front of the automobile upon the release of the retaining means therefor, and means for simultaneously releasing the retaining means for the bumper and fender.

5. In a safety device for automobiles, the combination with the automobile frame, of a horizontally disposed transverse casing carried by the frame, the casing having its front face open, a collapsible fender carried by said casing, said fender comprising top and bottom horizontal frame members, a pair of front braces each pivotally connected to the top and bottom frame members adjacent to the ends thereof, said braces hinged intermediately of their length, top and bottom rear supports hinged intermediately of their length and each pivotally connected at one end to one of the top and bottom frame members and at the other end to the rear inside face of the casing, coil tension springs connecting the front braces, coil springs connecting corresponding pairs of rear supports, the casing provided with rearwardly extending slots in its top and bottom faces, the rear supports adapted to engage said slots, a flexible mesh net secured to and extending between the top and bottom frame members, retaining stops for the front open face of the casing and means for releasing said stops to clear the front open face of the casing as desired.

6. In a safety device for automobiles, the combination with the automobile frame, of a horizontally disposed transverse casing carried by the frame, the casing having its front face open, a collapsible fender carried by said casing, said fender comprising top and bottom horizontal frame members, a pair of front braces each pivotally connected to the top and bottom frame members adjacent to the ends thereof, said braces hinged intermediately of their length, top and bottom rear supports hinged intermediately of their length and each pivotally connected at one end to one of the top and bottom frame members and at the other end to the rear inside face of the casing, coil tension springs connecting the front braces, coil springs connecting corresponding pairs of rear supports, limiting means on the hinges of the braces and supports for preventing the opening of said braces and supports beyond the straight line joining the ends thereof, the casing provided with rearwardly extending slots in its top and bottom faces, the rear supports adapted to engage said slots, a flexible mesh net secured to and extending between the top and bottom frame members, retaining stops for the front open face of the casing and means for releasing said stops to clear the front open face of the casing as desired.

7. In a safety device for automobiles, the combination with the automobile frame, of a horizontally disposed transverse casing carried by the frame, the casing having its front face open, a collapsible fender carried by said casing, said fender comprising top and bottom horizontal frame members, a pair of front braces each pivotally connected to the top and bottom frame members adjacent to the ends thereof, said braces hinged intermediately of their length, top and bottom rear supports hinged intermediately of their length and each pivotally connected at one end to one of the top and bottom frame members and at the other end to the rear inside face of the casing, coil tension springs connecting the front braces, coil springs connecting corresponding pairs of rear supports, limiting means on the hinges of the braces and supports for preventing the opening of said braces and supports beyond the straight line joining the ends thereof, the casing provided with rearwardly extending slots in its top and bottom faces, the rear supports adapted to engage said slots, a flexible mesh net secured to and extending between the top and bottom frame members, a horizontally disposed spring actuated roller carried by the net intermediately of the length thereof, retaining stops for the front open face of the casing and means for releasing said stops to clear the front open face of the casing as desired.

8. In a safety device for automobiles, the combination with the automobile frame, of a horizontally disposed transverse casing carried by the frame, the casing having its front face open, a collapsible fender carried by said casing, said fender comprising top and bottom horizontal frame members, a pair of front braces each pivotally connected to the top and bottom frame members adjacent to the ends thereof, said braces hinged intermediately of their length, top and bottom rear supports hinged intermediately of their length and each pivotally connected at one end to one of the top and bottom frame members and at the other end to the rear inside face of the casing, coil tension springs connecting the front braces, coil springs connecting corresponding pairs of rear supports, the casing provided with rearwardly extending slots in its top and bottom faces, the rear supports adapted to engage said slots, a flexible mesh net secured to and extending between the top and bottom frame members, retaining stops for the front open face of the casing, means for releasing said stops to clear the front open face of the casing as desired, a bumper hingedly carried by the casing, means for normally retaining the bumper in a lowered position in front of the casing, and spring means for swinging the bumper upwardly and rearwardly upon the release of said retaining means.

9. In a safety device for automobiles, the combination with the automobile frame, of a horizontally disposed transverse casing carried by the frame, the casing having its front face open, a collapsible fender carried by said casing, said fender comprising top and bottom horizontal frame members, front articulated braces pivotally connected to the upper and lower frame members, rear articulated supports each pivotally connected at one end to one of the upper and lower supports and at the other end to the inside rear face of the casing, coil tension springs connecting the front articulated braces, coil springs connecting corresponding pairs of rear articulated supports, the casing provided with rearwardly extending slots in its top and bottom faces, the rear supports adapted to engage said slots, a flexible mesh net secured to and extending between the top and bottom frame members, retaining stops for the front open face of the casing and means for releasing said stops to clear the front open face of the casing as desired.

10. In a safety device for automobiles, the combination with the frame of the automobile, of a horizontally disposed transverse casing carried at the front end of the frame, the casing having its front face open, a collapsible fender carried by said casing and adapted to be contained in a collapsed inoperative position therein, spring means for projecting said fender forwardly out of the casing into an extended operative position in front of the automobile, a depending finger hingedly carried by the top front edge of the casing and extending below the bottom edge thereof, a rocker arm pivotally carried by the under side of the casing and having an orifice adjacent to its front end, said depending finger adapted to engage the orifice in the rocker arm, a spring co-acting with the rocker arm and tending to normally disengage the rocker arm from the finger, a wedge adapted to depress the rear end of the rocker arm to maintain the engagement between the rocker arm and finger, and means for withdrawing the wedge as desired.

11. In a safety device for automobiles, the combination with the frame of the automobile, of a horizontally disposed transverse casing carried at the front end of the frame, the casing having its front face open, a collapsible fender carried by the casing and adapted to be contained in a collapsed inoperative position therein, spring means for projecting said fender forwardly out of the casing into an extended operative position in front of the automobile, depending fingers hingedly carried by the top front edge of the casing and extending below the bottom edge thereof, a pair of right angular brackets hingedly mounted on the rear top edge of the casing and adapted to engage the top and front faces of the casing, a bumper rigidly carried by said brackets, tension coil springs co-acting between the brackets and automobile frame and tending to swing the brackets upwardly and backwardly about their hinges, a depending stud carried by the front arm of each bracket and extending below the bottom edge of the casing, rocker arms pivotally carried by the under side of the casing and each having an orifice adjacent to the front end thereof, said orifices adapted to engage the lower ends of the depending fingers and the depending studs on the bracket, springs co-acting with the rocker arms and tending to normally break said engagement, wedges adapted to depress the rear ends of the rocker arms to maintain said engagement and means for withdrawing said wedges simultaneously.

WILLIAM PATRICK DWYER.

Witnesses:
 JOHN J. HAYWARD,
 NORMAN COLES.